United States Patent [19]
Adler

[11] 3,726,330
[45] Apr. 10, 1973

[54] SCREW FASTENER
[76] Inventor: Robert B. Adler, 6855 Cornell Road, Cincinnati, Ohio 45242
[22] Filed: July 28, 1971
[21] Appl. No.: 166,804

[52] U.S. Cl. .................................... 151/22, 85/46
[51] Int. Cl. .................................... F16b 39/22
[58] Field of Search ............... 85/46, 41, 47, 48, 85/44; 151/22, 2

[56] References Cited

UNITED STATES PATENTS

| | | | |
|---|---|---|---|
| 2,380,724 | 7/1945 | Crooks | 85/46 |
| 2,742,074 | 4/1956 | Rosan | 85/46 |
| 1,933,332 | 10/1933 | May | 85/47 |
| 2,263,137 | 11/1941 | Oestereicher | 85/46 |
| 3,081,482 | 3/1963 | Guerrant | 85/46 |

FOREIGN PATENTS OR APPLICATIONS 757,763  8/1972  Great Britain .................. 151/22

*Primary Examiner*—Edward C. Allen
*Attorney*—Pearce & Schaeperklaus

[57] ABSTRACT

A screw fastener having a narrow helical thread on the shank, the shank having a wall intermediate thread convolutions, which is substantially wider than the thread. Serrations on the wall lock the screw in a bore of a plastic boss.

3 Claims, 5 Drawing Figures

PATENTED APR 10 1973 3,726,330
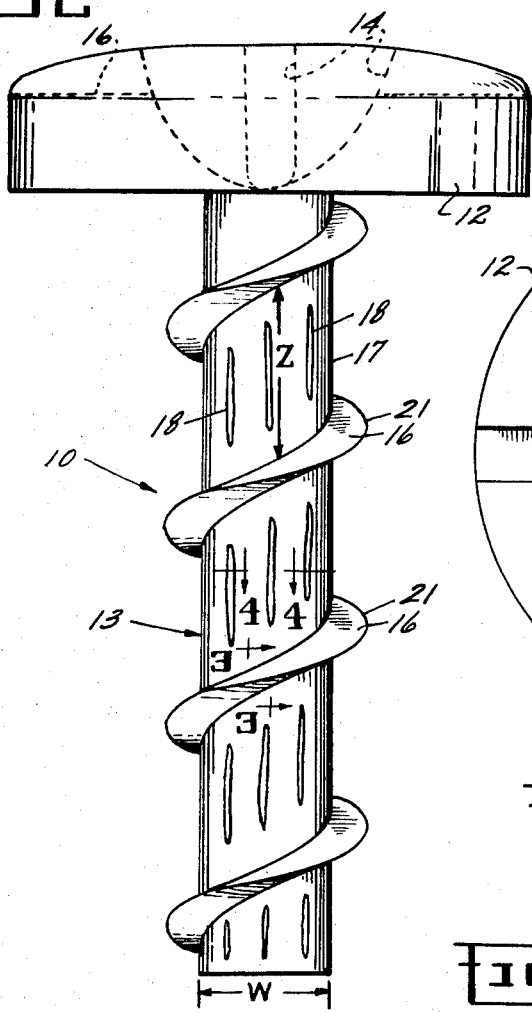
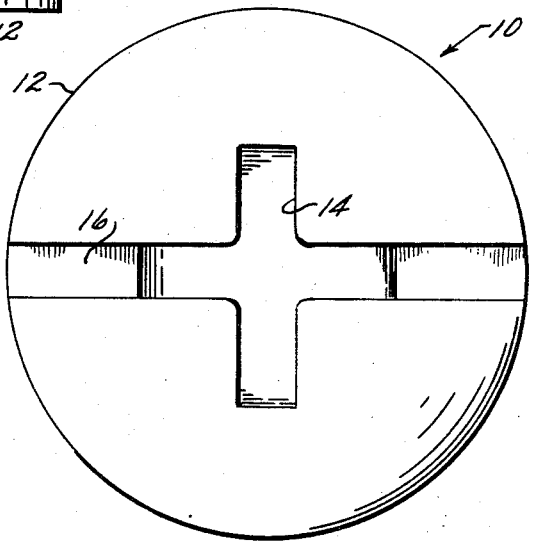
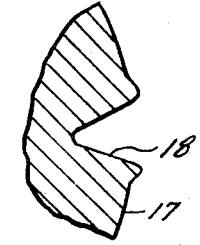
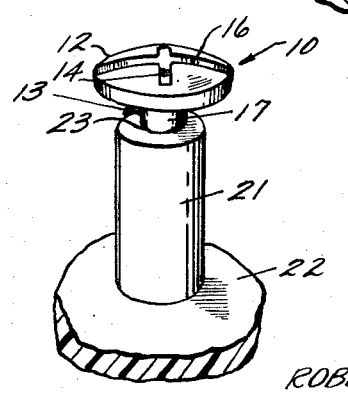
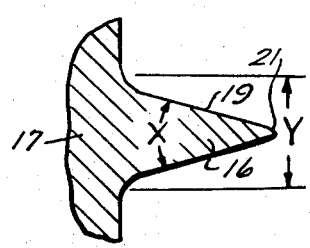
INVENTOR.
ROBERT B. ADLER
BY
Pearce & Schaeperklaus
ATTORNEYS

SCREW FASTENER

This invention relates to a screw construction. More particularly, this invention relates to a screw for mounting in plastic bosses and the like.

An object of this invention is to provide a screw which can be received in and firmly held in an opening or bore in a plastic boss but which does not distort the boss sufficiently to cause failure thereof.

Briefly, this invention provides a screw fastener having a helical thread in which convolutions of the thread are widely spaced with the spaces between thread convolutions approximately five times the width of the thread convolutions and in which lengthwise extending irregular grooves or serrations are formed in the spaces between convolutions which grip and hold the plastic to hold the screw in place.

The above and other objects and features of the invention will be apparent to those skilled in the art to which this invention pertains from the following detailed description and the drawing, in which:

FIG. 1 is a plan view of a screw fastener constructed in accordance with an embodiment of this invention;

FIG. 2 is a view in side elevation of the screw fastener shown in FIG. 1;

FIG. 3 is a view in enlarged section taken on the line 3—3 in FIG. 2;

FIG. 4 is a view in enlarged section taken on the line 4—4 in FIG. 2; and

FIG. 5 is a perspective view showing a fragmentary portion of a sheet of plastic material which carries a plastic boss, a screw fastener being shown mounted in an upright bore in the boss.

In the following detailed description and the drawing, like reference characters indicate like parts.

In FIGS. 1 and 2 is shown a screw fastener 10 constructed in accordance with an embodiment of this invention. The screw 10 includes a head 12 and a shank 13 (FIG. 2). The head 12 is provided with a cross-shaped slot 14. One bar 16 of the slot is elongated and extends to edges of the head to provide a crosswise slot which can receive a conventional screw driver blade (not shown).

The shank 13 is provided with a helical thread 16, convolutions of which are widely spaced with a generally cylindrical shaped wall section 17 between convolutions. Lenthwise extending irregular serrations or grooves 18 are formed in the face of the wall section 17 as shown most clearly in FIG. 4. The thread 16 is preferably substantially triangular in cross section with an angle X (FIG. 3) between faces 19 and 21 of the thread being approximately 30° and the width of the thread Y being approximately one-fourth of the diameter W (FIG. 2) of the wall section 17 and approximately one-fifth of the width Z of the wall section 17 taken between convolutions of the thread parallel to the axis of the screw fastener.

The screw fastener 10 is particularly structured for mounting in a boss 21 (FIG. 5) which is mounted on and integral with a molded plastic member 22. The shank of the screw fastener is received in a bore 23 in the boss 21. The fastener can be used to attach an element (not shown) to the boss. The narrow edge of the thread permits the thread to cut into the plastic material of the bore of the boss without substantially distorting the plastic material except adjacent the thread, and the fastener can be advanced into the bore without causing rupture of the material of the boss. The serrations 18 can be engaged by the plastic material of the bore to secure the screw fastener in position.

The screw fastener construction illustrated in the drawing and described above is subject to structural modification without departing from the spirit and scope of the appended claims.

Having described my invention, what I claim as new and desire to secure by Letters Patent is:

1. A screw fastener which comprises a shank, a head, and a helical thread on the shank, the shank having a wall intermediate thread convolutions, the wall being substantially wider than the thread, there being a plurality of lengthwise grooves formed only in the shank wall between the thread convolutions with ridges on the wall at the sides of the grooves, each groove with its adjacent ridges being spaced from adjacent grooves with their adjacent edges by shank wall portions intermediate ridges, the thread being substantially triangular in cross section with exposed faces thereof meeting at an angle to define a narrow edge.

2. A screw fastener as in claim 1 wherein the grooves terminate short of the thread convolutions.

3. A screw fastener which comprises a shank, a head, and a helical thread on the shank, the shank having a wall intermediate thread convolutions, the wall being substantially wider than the thread, there being a plurality of lengthwise grooves formed only in the shank wall between the thread convolutions with ridges on the wall at the sides of the grooves, each groove with its adjacent ridges being spaced from adjacent grooves with their adjacent edges by shank wall portions intermediate ridges, the thread being substantially triangular in cross section with exposed faces thereof meeting at an angle of approximately 30°.

* * * * *